Figure 1:
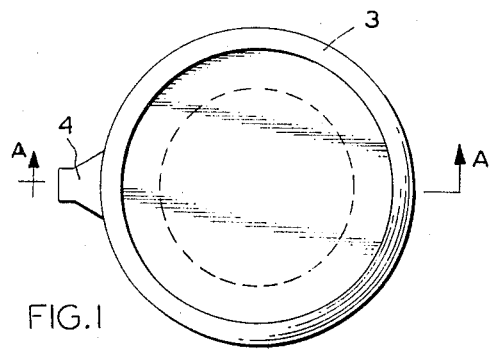

May 14, 1968 A. J. CARBONE 3,383,256
PROCESS AND APPARATUS FOR CAPPING PLASTIC CONTAINERS
Filed Sept. 14, 1964 2 Sheets-Sheet 1

INVENTOR
ANTHONY J. CARBONE

BY
ATTORNEYS

May 14, 1968   A. J. CARBONE   3,383,256
PROCESS AND APPARATUS FOR CAPPING PLASTIC CONTAINERS
Filed Sept. 14, 1964   2 Sheets-Sheet 2

INVENTOR
ANTHONY J. CARBONE

BY
ATTORNEYS

United States Patent Office 3,383,256
Patented May 14, 1968

3,383,256
PROCESS AND APPARATUS FOR CAPPING PLASTIC CONTAINERS
Anthony J. Carbone, Midland, Mich., assignor to The Dow Chemical Company, Midland, Mich., a corporation of Delaware
Filed Sept. 14, 1964, Ser. No. 396,141
10 Claims. (Cl. 156—69)

This invention relates to a process and apparatus for forming caps from a web material and applying those caps to pre-formed plastic containers.

In the recent past, thermoplastic materials have been used in an increasing volume and in a wider variety of applications as containers and their closures. These applications include not only bottles, jars, and other containers normally made from glass, but also cups, boxes and other containers made from paper and similar materials. One of the problems in supplying a closure is to provide a seal between the container and the closure that has no leaks and yet can be broken easily when the closure is to be removed. Glass bottles and paper cups are normally closed by crown caps and flat covers, which depend upon friction and pressure to effect a seal. With the advent of synthetic thermoplastics, it has become possible to take advantage of many physical and chemical properties possessed by these materials which are not found in glass or paper. One of these properties which can be used to advantage is the ability to heat seal or weld the thermoplastic material to itself, or to a dissimilar material. This property has been a key feature in the development of the present invention.

It is an object of this invention to provide a process for making and applying heat sealable caps to plastic containers. It is another object of this invention to provide an apparatus for manufacturing caps from a web of heat sealable material and for applying such caps to plastic containers. Other objects will appear to those skilled in the art of packaging from the more detailed description of this invention, which follows.

The foregoing objects are accomplished by providing a process by means of which a multiplicity of plastic containers are capped with a laminate of a metal foil and a heat sealable film of ethylene-vinyl acetate copolymer. The process entails the positioning of a web of the above-described laminate under a heated platen containing suitably machined grooves on its face. The grooves are connected to an internal source of vacuum which is of sufficient strength to suck a web against the face of the platen and into the grooves so as to form the web into that grooved structure. The thus formed web will fit tightly over the lips of a multiplicity of containers to be capped simultaneously. The platen is heated so that when it applies the vacuum-formed web to a multiplicity of plastic containers, the copolymeric film will be heat sealed to the containers. A subsequent operation for cutting and trimming the cap from the remainder of the web leaves each individual container closed and sealed with its own cap.

Figure 3:
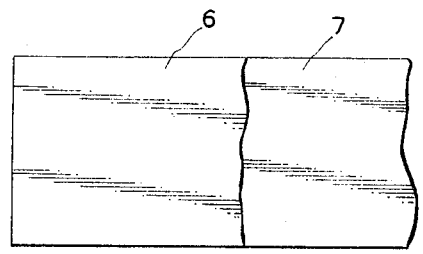
Figure 4:
Figure 2:
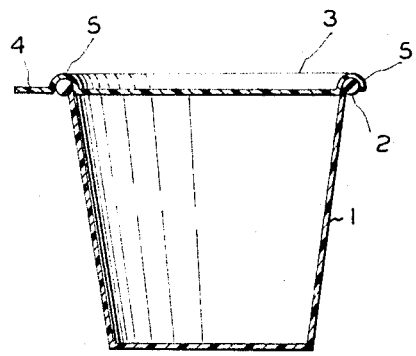
Figure 5:
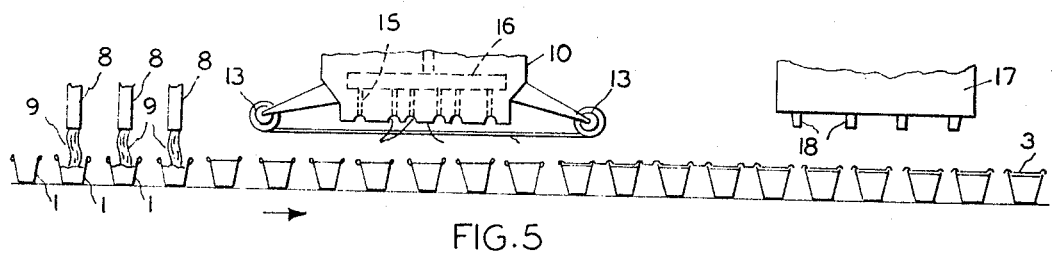

A more thorough understanding of this invention may be had by reference to the attached drawings. FIGURE 1 is a plan view of the capped container. FIGURE 2 is a cross-sectional vew of FIGURE 1 taken along section A—A of FIGURE 1. FIGURE 3 is a partially broken plan view of the web employed as the cap material. FIGURE 4 is an elevation view of the web of FIGURE 3. FIGURE 5 is a schematic illustration of a production line for filling and capping plastic containers in accordance with this invention. FIGURES 6, 7, 8, and 9 are partial cross-sectional views of sequential steps involved in forming caps from a web laminate, applying those caps to a multiplicity of plastic containers and cutting and trimming the caps to produce individually capped containers.

In FIGURES 1 and 2 a plastic container 1 having a rolled lip 2 is closed with cap 3 having an integrally formed manual tab 4 for removing the cap from the container. Cap 3 is sealed to container 1 by a heat sealing operation which welds the material of container 1 to the material of cap 3 along interface 5. The container shown in these figures is a conventional round cup with a rolled lip, although it is not intended that this invention be lim'ted to any one style or shape of container and cap. This invention is applicable to cups having shapes other than circular, for example, square, rectangular, elliptical, triangular, and any variety of irregular cross-sections such as may be found in scalloped, fluted, and other artistically designed containers. Furthermore, the lip of the container need not be a rolled circular shape, but may take on any other configuration and may within certain embodiments of this invention be eliminated entirely since it is only necessary that there be sufficient area of contact between the cap and the container at the location of the lip in order to provide a sealed fitting. It is preferable, however, both from a consideration of structural design and the ease with which the cap may be attached to the container, to employ containers with lips that are somewhat thicker than the container wall.

FIGURES 1 and 2 illustrate a cap having tab 4 which is intended to be used to remove the cap from the container. The size and shape of this tab may be varied widely, or even be eliminated entirely, without departing from the spirit of this invention.

FIGURES 3 and 4 illustrate the web material from which cap 3 is manufactured. The essential components of this web are a metal foil 6 and a thermoplastic, heat sealable film 7. The metal foil, which preferably is aluminum, serves the purposes of providing a barrier for moisture and air, and provides the cap with the capability of being reused to temporarily recover the container once it is opened. Metal foils, such as aluminum foil, can be crimped and will retain their crimped shape, thus permitting this cap to be reapplied with a reasonably snug fit, after the heat seal is broken.

The thermoplastic film of this laminate is one which can be readily adhered to metal foil 6 and can be heat sealed to container 1. It is obvious that many types of materials might serve this purpose and that the choice of the material will depend to some extent upon the material from which the plastic container is manufactured. Thus, if container 1 were made of polyethylene, plastic film 7 might also be polyethylene. The choice of these two materials is not a critical part of this invention but is one which will be readily accomplished by those skilled in the art of polymer chemistry and its applications. In the case where the container 1 is made of polystyrene, it has been found to be highly desirable to employ as the material for film 7 a copolymer of ethylene/vinyl acetate, which adheres well to aluminum and which can be readily heat sealed to polystyrene. Accordingly, the preferred combination in this invention for reasons of economy and availability is one in which plastic container 1 is made of polystyrene, metal foil 6 is aluminum, and film 7 is ethylene/vinyl acetate copolymer.

By reference to FIGURE 5 one may understand how the process and apparatus of this invention can be incorporated into a production line for filling and capping containers. A multiplicity of plastic containers 1 move in the direction of the arrow from left to right and are filled from tubes 8 with contents 9 and are then conveyed to a station for capping. Capping platen 10 is shown of such a size as to make three caps at one time. It will be understood that this is merely illustrative and that the number of caps which can be made at one time depends entirely upon the size and economies of the particular job. Web 11 is supplied to face 12 of platen 10 in any manner which is convenient and efficient from an engineering point of view. In this illustration, web 11 is supplied in the form of cut lengths transported in a flexible carrier travelling between rolls 13. Other equivalent means for supplying web 11 will be apparent to skilled engineers. Face 12 of platen 10 is machined with a series of grooves 14 which are of such size and shape as to conform generally to the lip of the container to be capped, and the number of such grooves corresponds to the number of containers to be closed in a single operation. Grooves 14 are connected by means of passageways 15 to vacuum reservoir 16 which in turn is connected to a vacuum source not shown on these drawings. After the filled containers are capped, they continue to pass along the conveyor until they are in a position to be trimmed. Cutter 17 has a series of blades 18 positioned in such a manner as to cut web 11 between adjacent containers and thereby produce individually capped containers. The exact manner in which this operation is performed is not a part of this invention since it may be accomplished in any convenient manner, such as a blanking operation or alternatively by manual operations. A typical arrangement for a blanking operation is shown schematically in FIGURE 9 where movable cutter blades 18 are moved vertically downward against stationary cutter blades 19 to accomplish a trimming operation separating each capped container from the remainder of web 11.

Figure 6:
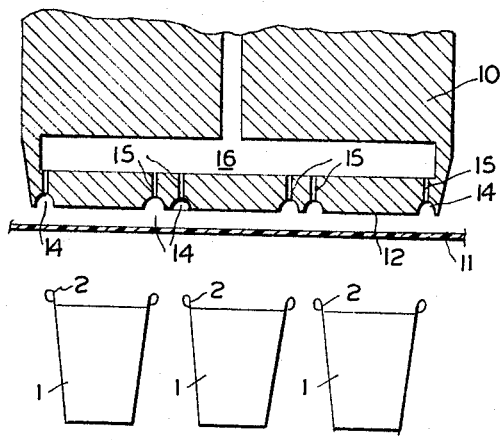
Figure 7:
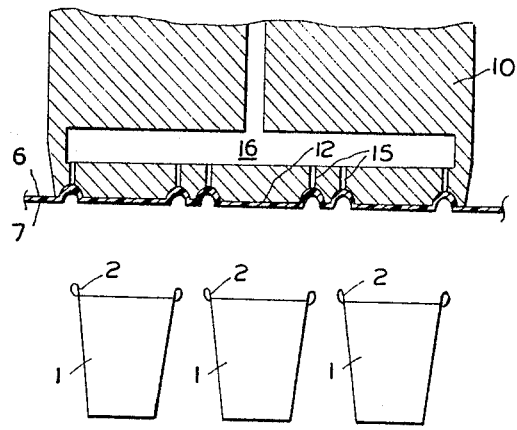
Figure 8:
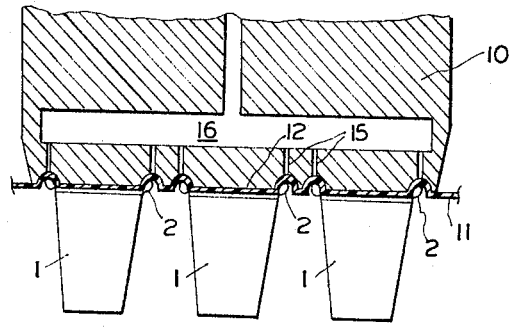

FIGURES 6, 7, and 8 show three stages in the operation of movable platen 10. In FIGURE 6 platen 10 has face 12 machined with grooves 14 which are connected through channels 15 to vacuum reservoir 16. Platen 10 is in its uppermost position ready to vacuum-form web 11 into a multiplicity of caps for containers 1. Vacuum is applied pulling web 11 against face 12 and giving it the configuration of the several grooves 14 as shown in FIGURE 7. Web 11 is oriented such that the metal foil 6 is in contact with face 12 and plastic foil 7 faces downwardly ready to contact lips 2 of plastic containers 1. Platen 10 is heated (by means not shown on the drawing) causing film 7 to be in a condition to be heat sealed to containers 1.

Figure 9:
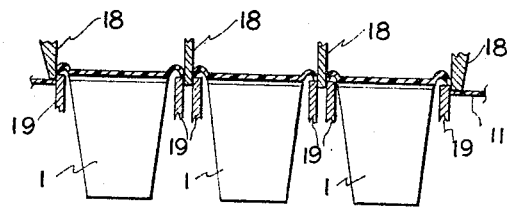

In FIGURE 8 platen 10 has been moved downwardly from its position shown in FIGURE 7 and has pressed the vacuum-formed web 11 over the lips 2 of plastic containers 1. In its heated condition, film 7 of web 11 is heat sealed to the surfaces of lips 2. As soon as this operation is completed, the vacuum in reservoir 16 is released which causes web 11 to be released from platen face 12. Platen 10 then moves upwardly leaving web 11 heat sealed to the multiplicity of containers 1. Platen 10 thereby returns to the position shown in FIGURE 6 ready to receive another series of containers and another section of web 11 for the next capping cycle. The multiplicity of containers 1 are capped by a single piece of web 11 which subsequently is cut away by a trimming operation as shown in FIGURE 9 to produce individual containers each of which is closed with a heat sealed cap.

The foregoing description and drawings are intended to be illustrative and not to be restrictive. This invention is not to be construed as limited in any manner other than that described in the appended claims.

I claim:

1. A process for simultaneously capping a multiplicity of plastic containers which comprises vacuum-forming a multiplicity of caps in a segment of web comprising a metal foil laminated to a thermoplastic film which is heat sealable to the plastic of said containers, simultaneously affixing the said multiplicity of caps to a multiplicity of said plastic containers, heat sealing the said caps to the said containers, and trimming the excess web from the caps to produce separately capped containers.

2. The process of claim 1 in which said plastic containers are composed of polymeric styrene.

3. The process of claim 1 in which said thermoplastic film is a polymer of a monoolefin.

4. The process of claim 1 in which said thermoplastic film is a copolymer of ethylene/vinyl acetate.

5. The process of claim 1 in which said metal foil is aluminum foil.

6. A process for simultaneously capping a multiplicity of polystyrene containers which comprises vacuum forming a multiplicity of caps from a web comprising a laminate of aluminum foil and a film of an ethylene/vinyl acetate copolymer, simultaneously affixing the vacuum-formed multiplicity of caps to a multiplicity of polystyrene containers, heat sealing the said film to the said containers and trimming the excess web between adjacent caps to produce separately capped containers.

7. A device for simultaneously capping a multiplicity of plastic containers which comprises a movable, grooved platen, a vacuum producing means connected to the grooves on the platen, a means for heating the platen, a means for supplying a web of metal foil laminated to a thermoplastic film to the face of said platen, and a means for supplying a multiplicity of plastic containers to a position whereby the said platen can cap the containers with the said web and heat seal each cap to its container.

8. A device for forming and capping cup-like polystyrene containers comprising a vertically movable heated platen with its bottom face being so shaped and contoured as to conform in a mating relationship with the tops of a multiplicity of caps, means for appliyng a vacuum to the concave contours on said bottom face, means for heating said platen, means for supplying a web comprising a laminate of a metal foil and a film of a heat sealable polymer of a monoolefin, means for supplying a multiplicity of plastic containers to a position in register with that of said platen, and means for moving said platen to the tops of said containers.

9. A process for capping a plastic container which comprises vacuum-forming a cap in a segment of web comprising a metal foil laminated to a thermoplastic film, which is heat sealable to the plastic of said container, simultaneously affixing said cap to said plastic container, heat sealing the said cap to the said container, and trimming the excess web from the cap to produce a capped container.

10. A device for capping a plastic container which comprises a movable, grooved platen, a vacuum producing means connected to the grooves on the platen, a means for heating the platen, a means for supplying a web of metal foil laminated to a thermoplastic film to the face of said platen, and a means for supplying a plastic container to a position whereby the said platen can cap the container with the said web and heat seal the cap to the container.

References Cited

UNITED STATES PATENTS

| 1,737,874 | 12/1929 | Busch | 264—92 |
|---|---|---|---|
| 2,402,943 | 7/1946 | Bogoslowsky | 156—69 X |
| 2,486,760 | 11/1949 | Pfeiffer | 264—92 X |
| 2,873,227 | 2/1959 | Olson et al. | 264—92 X |
| 3,074,838 | 1/1963 | Little | 156—382 X |
| 3,236,715 | 2/1966 | Gunderson | 156—382 |
| 3,282,763 | 11/1966 | Gunderson | 156—382 X |
| 3,321,562 | 5/1967 | Wanderer | 264—92 X |
| 3,336,424 | 8/1967 | Cheney | 264—92 X |
| 3,338,997 | 8/1967 | Tigner | 264—92 X |
| 3,342,914 | 9/1967 | Edwards | 264—92 X |
| 3,348,265 | 10/1967 | King et al. | 264—92 X |
| 3,346,435 | 10/1967 | Beck | 156—69 X |

EARL M. BERGERT, *Primary Examiner.*

HAROLD ANSHER, *Assistant Examiner.*